(12) United States Patent
Shin et al.

(10) Patent No.: US 12,361,266 B2
(45) Date of Patent: Jul. 15, 2025

(54) HIERARCHICAL WEIGHT PREPROCESSING FOR NEURAL NETWORK ACCELERATOR

(71) Applicant: Samsung Electronics Co., Ltd., Suwon-si (KR)

(72) Inventors: Jong Hoon Shin, San Jose, CA (US); Ali Shafiee Ardestani, San Jose, CA (US); Hamzah Ahmed Ali Abdelaziz, San Jose, CA (US); Joseph H. Hassoun, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1085 days.

(21) Appl. No.: 16/990,970

(22) Filed: Aug. 11, 2020

(65) Prior Publication Data

US 2021/0357748 A1 Nov. 18, 2021

Related U.S. Application Data

(60) Provisional application No. 63/024,676, filed on May 14, 2020.

(51) Int. Cl.
*G06N 3/06* (2006.01)
*G06F 17/16* (2006.01)
(Continued)

(52) U.S. Cl.
CPC .............. *G06N 3/06* (2013.01); *G06F 17/16* (2013.01); *G06N 3/0464* (2023.01); *G06N 3/063* (2013.01);
(Continued)

(58) Field of Classification Search
CPC ........ G06N 3/06; G06N 3/063; G06N 3/0464; G06N 3/08; G06N 7/04; G06N 20/00; G06F 17/16
See application file for complete search history.

(56) References Cited

U.S. PATENT DOCUMENTS 10,963,787 B2 * 3/2021 Zlateski ................ G06N 20/10
11,422,781 B1 * 8/2022 Neuendorffer .......... G06F 8/443
(Continued)

FOREIGN PATENT DOCUMENTS

WO   WO-2019157599 A1 *  8/2019  ......... G06F 13/4282
WO   WO-2020014590 A1 *  1/2020  ............ G06F 17/16
(Continued)

OTHER PUBLICATIONS

Stuart, Dylan "An Efficient Hardware Architecture for Exploiting Sparsity in Neural Networks" Nov. 27, 2019, pp. 1-66. (Year: 2019).*

(Continued)

*Primary Examiner* — Miranda M Huang
*Assistant Examiner* — Chase P. Hinckley
(74) *Attorney, Agent, or Firm* — Lewis Roca Rothgerber Christie LLP

(57) ABSTRACT

A system and method for weight preprocessing. In some embodiments, the method includes performing intra-tile preprocessing of a first weight tensor to form a first preprocessed weight tensor, and performing inter-tile preprocessing of the first pre-processed weight tensor, to form a second pre-processed weight tensor. The intra-tile preprocessing may include moving a first element of a first weight tile of the first weight tensor by one position, within the first weight tile, in a lookahead direction or in a lookaside direction. The inter-tile preprocessing may include moving a first row of a weight tile of the first pre-processed weight tensor by one position in a lookahead direction or by one position in a lookaside direction.

20 Claims, 18 Drawing Sheets

(51) Int. Cl.
*G06N 3/0464* (2023.01)
*G06N 3/063* (2023.01)
*G06N 3/08* (2023.01)
*G06N 7/04* (2006.01)
*G06N 20/00* (2019.01)

(52) U.S. Cl.
CPC ................ *G06N 3/08* (2013.01); *G06N 7/04* (2013.01); *G06N 20/00* (2019.01)

(56) References Cited

U.S. PATENT DOCUMENTS

| | | | |
|---|---|---|---|
| 11,429,852 B2* | 8/2022 | Lu | G06F 9/544 |
| 2010/0312735 A1 | 12/2010 | Knoblauch | |
| 2017/0124464 A1 | 5/2017 | Crabtree et al. | |
| 2017/0228645 A1 | 8/2017 | Wang et al. | |
| 2018/0046916 A1* | 2/2018 | Dally | G06F 7/523 |
| 2018/0150721 A1* | 5/2018 | Mostafa | G06N 3/063 |
| 2018/0253816 A1 | 9/2018 | John | |
| 2018/0285254 A1* | 10/2018 | Baum | G06N 20/00 |
| 2019/0087713 A1 | 3/2019 | Lamb et al. | |
| 2019/0205696 A1* | 7/2019 | Owechko | G06F 18/2134 |
| 2019/0205740 A1 | 7/2019 | Judd et al. | |
| 2019/0332941 A1* | 10/2019 | Towal | G06N 3/082 |
| 2019/0370631 A1* | 12/2019 | Fais | G06N 3/045 |
| 2019/0378011 A1* | 12/2019 | Iwakura | G06N 3/084 |
| 2019/0379396 A1* | 12/2019 | Bajic | G06N 3/044 |
| 2020/0104692 A1* | 4/2020 | Hill | G06N 3/0464 |
| 2020/0159809 A1* | 5/2020 | Catthoor | G06N 3/04 |
| 2020/0226473 A1* | 7/2020 | Sharma | G06N 3/04 |
| 2020/0228137 A1* | 7/2020 | Chinya | G06F 17/153 |
| 2020/0278888 A1* | 9/2020 | Connor | G06F 9/5077 |
| 2020/0285949 A1* | 9/2020 | Baum | G06N 3/04 |
| 2020/0285950 A1* | 9/2020 | Baum | G06N 3/04 |
| 2020/0293770 A1* | 9/2020 | Chen | G06N 3/045 |
| 2021/0004668 A1* | 1/2021 | Moshovos | G06N 3/045 |
| 2021/0103550 A1* | 4/2021 | Appu | G06F 9/3836 |
| 2021/0125070 A1* | 4/2021 | Wang | G06N 3/063 |
| 2021/0141571 A1* | 5/2021 | Lew | G06F 3/0655 |
| 2021/0191724 A1* | 6/2021 | Pal | G06F 9/3001 |
| 2021/0191733 A1* | 6/2021 | Gunnam | G06F 18/24 |
| 2021/0209450 A1* | 7/2021 | Cassidy | G06N 3/063 |
| 2021/0303909 A1* | 9/2021 | Gunnam | G06V 10/764 |
| 2021/0303976 A1* | 9/2021 | Gunnam | G06N 3/08 |
| 2021/0303993 A1* | 9/2021 | Saeedi | G06N 3/04 |
| 2021/0326683 A1* | 10/2021 | Narayanaswami | G06N 3/045 |
| 2022/0012593 A1* | 1/2022 | Huang | G06N 3/045 |
| 2022/0245453 A1* | 8/2022 | Majnemer | G06F 9/5066 |
| 2023/0052942 A1* | 2/2023 | Chauhan | G06F 9/5027 |

FOREIGN PATENT DOCUMENTS

| | | | | |
|---|---|---|---|---|
| WO | WO-2020190772 A1 * | 9/2020 | | |
| WO | WO-2020190808 A1 * | 9/2020 | ......... | G06F 12/0806 |
| WO | WO-2020190809 A1 * | 9/2020 | ......... | G06F 12/0806 |

OTHER PUBLICATIONS

Srivastava et al., "Tensaurus: A Versatile Accelerator for Mixed Sparse-Dense Tensor Computations" Apr. 16, 2020, pp. 689-702. (Year: 2020).*
Gondimalla et al., "SparTen: A Sparse Tensor Accelerator for Convolutional Neural Networks" Oct. 2019, pp. 151-165. (Year: 2019).*
Moreau et al., "A Hardware-Software Blueprint for Flexible Deep Learning Specialization" Apr. 23, 2019, arXiv: 1807.04188v3, pp. 1-7. (Year: 2019).*
Zheng et al., "FlexTensor: An Automatic Schedule Exploration and Optimization Framework for Tensor Computation on Heterogeneous System" Mar. 2020, pp. 859-873. (Year: 2020).*
Hedge et al., "ExTensor: An Accelerator for Sparse Tensor Algebra" Oct. 2019, pp. 319-333. (Year: 2019).*
Xi et al., "SMAUG: End-to-End Full-Stack Simulation Infrastructure for Deep Learning Workloads" Dec. 11, 2019, arXiv: 1912.04481v2, pp. 1-14. (Year: 2019).*
Zhang et al., "Lookahead Optimizer: k steps forward, 1 step back" Dec. 3, 2019, arXiv: 1907.08610v2, pp. 1-19. (Year: 2019).*
Aimar et al., "NullHop: A Flexible Convolutional Neural Network Accelerator Based on Sparse Representations of Feature Maps" Mar. 2019, pp. 646-656. (Year: 2019).*
Zhu et al., "An Efficient Hardware Accelerator for Structured Sparse Convolutional Neural Networks on FPGA" Jan. 7, 2020, arXiv: 2001.01955v1, pp. 1-12. (Year: 2020).*
Kim et al., "torchgpipe: On-the-fly Pipeline Parallelism for Training Giant Models" Apr. 21, 2020, arXiv: 2004.09910v1, pp. 1-10. (Year : 2020).*
Lu et al., "Tetris: Re-architecting Convolutional Neural Network Computation for Machine Learning Accelerators" Jan. 3, 2019, pp. 1-8. (Year: 2019).*
Kim et al., "FPGA Prototyping of Low-Precision Zero-Skipping Accelerator for Neural Networks" 2018, IEEE, pp. 1-7. (Year: 2018).*
Qin et al., "SIGMA: A Sparse and Irregular GEMM Accelerator with Flexible Interconnects for DNN Training" Apr. 16, 2020, pp. 58-70. (Year: 2020).*
Zhu et al., "Sparse Tensor Core: Algorithm and Hardware Co-Design for Vector-wise Sparse Neural Networks on Modern GPUs" Oct. 2019, pp. 359-371. (Year: 2019).*
Wu et al., "Compute-Efficient Neural-Network Acceleration" Feb. 2019, pp. 191-200. (Year: 2019).*
Struhark et al., "CoNNa-Hardware accelerator for compressed convolutional neural networks" Jan. 11, 2020, pp. 1-28. (Year: 2020).*
Hojabr et al., "SkippNN: An Embedded Sotchastic-Computing Accelerator for Convolutional Neural Networks" Jun. 2019, pp. 1-6. (Year: 2019).*
Song et al., "AccPar: Tensor Partitioning for Heterogeneous Deep Learning Accelerators" Apr. 16, 2020, pp. 342-355. (Year: 2020).*
Boutros et al., "You Cannot Improve What You Do Not Measure: FPGA vs. ASIC Efficiency Gaps for Convolutional Neural Network Inference" Dec. 2018, pp. 1-22. (Year: 2018).*
Chou et al., "Automatic Generation of Efficient Sparse Tensor Format Conversion Routines" Apr. 8, 2020, arXiv: 2001.02609v2, pp. 1-16. (Year: 2020).*
Zhang et al., "SpArch: Efficient Architecture for Sparse Matrix Multiplication" Feb. 20, 2020, arXiv: 2002.08947v1, pp. 1-15. (Year: 2020).*
Soltaniyeh et al., "Synergistic CPU-FPGA Acceleration of Sparse Linear Algebra" Apr. 29, 2020, arXiv: 2004.13907v1, pp. 1-12. (Year: 2020).*
Lascorz, A.D. et al., "Bit-Tactical: A Software/Hardware Approach to Exploiting Value and Bit Sparsity in Neural Networks", ASPLOS '19, Providence, RI, USA, Apr. 13-17, 2019, 15 pages, Association for Computing Machinery.
Lascorz, A.D. et al., "Bit-Tactical: Exploiting Ineffectual Computations in Convolutional Neural Networks: Which, Why, and How", arXiv:1803.03688v1, Mar. 9, 2018, pp. 1-14.
Mahmoud, M. et al., "Accelerating Image-Sensor-Based Deep Learning Applications", IEEE Micro, Sep./Oct. 2019, pp. 26-35, IEEE Computer Society.
Stuart, Dylan J.M., "An Efficient Hardware Architecture for Exploiting Sparsity in Neural Networks," University of Toronto, ProQuest Dissertations & Theses, 2019, 63 pages.
Srivastava, Nitish, et al., "Tensaurus: A Versatile Accelerator for Mixed Sparse-Dense Tensor Computations," 2020 IEEE International Symposium on High Performance Computer Architecture (HPCA), 2020, pp. 689-702.
Korean Office Action dated Apr. 23, 2025, issued in Korean Patent Application No. 10-2021-0032408, 5 pages.

* cited by examiner

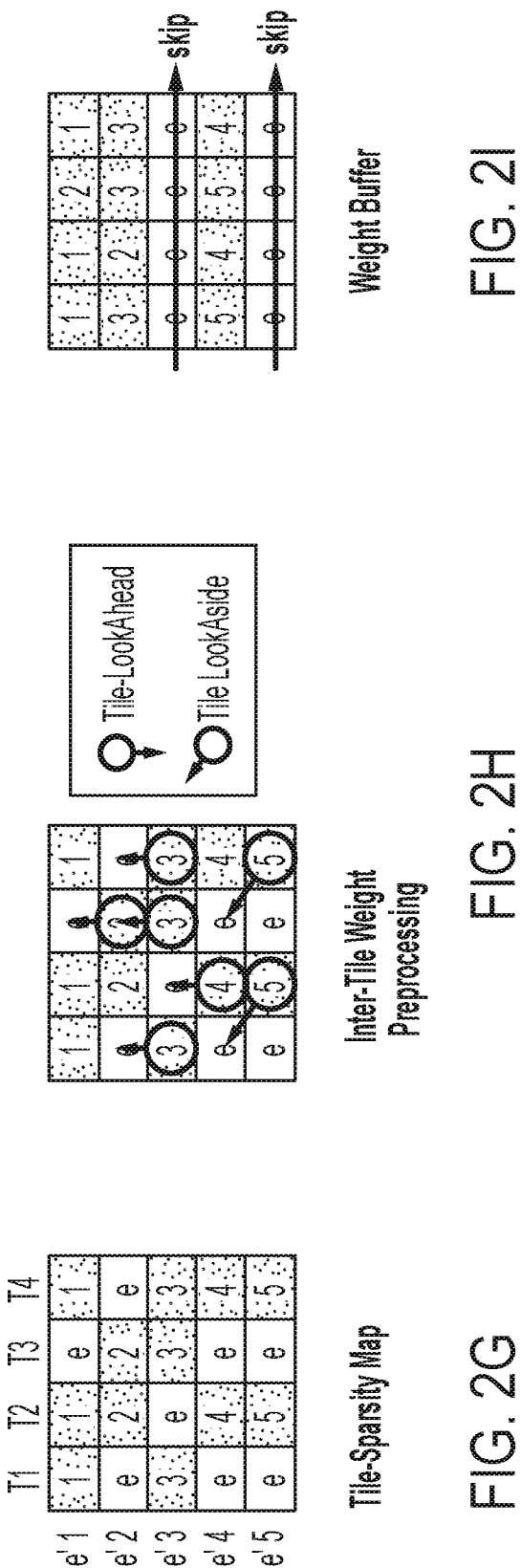

| Axes in Weight Tensor | Convolution | | | GEMV (F.C.) | |
|---|---|---|---|---|---|
| | C | K | RXS | Row | Column |
| Reducible | O | | O | O | |
| Irreducible | | O | | | O |

Axes-Type Table

FIG. 4B

| | | Activation (Act.) | Partial (Par.) |
|---|---|---|---|
| reducible axis (C-partition) $(h_i, d_i)$ | HW Process | Lookahead: Bring activations (for lower level $HW_{(i-1)}$) from $(0 \sim h_i)$- cycle Lookaside : Bring activation 1-cycle ahead and $(0 \sim d_i)$-step aside for $(0 \sim d_i)$-neighboring $HW_{(i-1)}$ | $C_0$: Reduced by adder tree $K_0$: Accumulated independently |
| | HW Overhead | (1) $A_i$ activation registers per input: $A_i = A_{(i-1)} + (h_i + 1)$ where $A_0 = 0$ (2) Activation promoter ($AP_i$, see next slide) which select $A_{(i-1)}$ activations out of $A_{(i)}$ activations: $A_i$-to-$A_{(i-1)}$ arbitration (3) Output-port of AP is connected to $d_i$ neighboring $HWs$ $_{(i-1)}$ for lookaside (4) $(d_i + 1)$-to-1 MUX per $HW_{(i-1)}$ to support lookaside selection | No HW overhead |
| irreducible axis (K-partition) $(h'_i, d'_i)$ | HW Process | Lookahead: Bring activations (for lower level $HW_{(i-1)}$) from $(0 \sim h'_i)$- cycle Lookaside : Bring activation 1-cycle ahead | $C_0$: Reduced by adder tree $K_0$: Partials are sent back to their original $HW_{(i-1)}$'s accumulators which locates in $(0 \sim d'_i)$-step aside $HW_{(i-1)}$. |
| | HW Overhead | (1) $A_i$ activation registers per input: $A_i = A_{(i-1)} + (h'_i + 1)$ where $A_0 = 0$ (2) Activation promoter ($AP_i$, see next slide) which select $A_{(i-1)}$ activations out of $A_{(i)}$ activations: $A_i$-to-$A_{(i-1)}$ arbitration | (1) $(d'_i + 1)$-to-1 MUX per $HW_{(i-1)}$ (2) $(d'_i + 1)$ input-adder per $HW_{(i-1)}$ |

FIG. 4F

HIERARCHICAL WEIGHT PREPROCESSING FOR NEURAL NETWORK ACCELERATOR

CROSS-REFERENCE TO RELATED APPLICATION(S)

The present application claims priority to and the benefit of U.S. Provisional Application No. 63/024,676, filed May 14, 2020, entitled "HIERARCHICAL WEIGHT PREPROCESSING FOR NEURAL NETWORK ACCELERATOR", the entire content of which is incorporated herein by reference.

FIELD

One or more aspects of embodiments according to the present disclosure relate to accelerators for neural networks, and more particularly to a system and method for hierarchical weight preprocessing for a neural network accelerator.

BACKGROUND

Calculations performed in neural networks may involve tensor products of weights and activations. The tensors involved may be relatively sparse, as a result of which significant inefficiency may be incurred if every element-wise product is calculated, because a significant fraction of these products may equal zero.

Thus, there is a need for an improved system and method for performing calculations for a neural network.

SUMMARY

According to an embodiment of the present invention, there is provided a method, including: performing intra-tile preprocessing of a first weight tensor to form a first pre-processed weight tensor, and performing inter-tile preprocessing of the first pre-processed weight tensor, to form a second pre-processed weight tensor, the intra-tile preprocessing including moving a first element of a first weight tile of the first weight tensor by one position, within the first weight tile, in a lookahead direction or in a lookaside direction, and the inter-tile preprocessing including moving a first row of a weight tile of the first pre-processed weight tensor by one position in a lookahead direction or by one position in a lookaside direction.

In some embodiments, the intra-tile preprocessing includes moving the first element of the first weight tile of the first weight tensor by one position, within the first weight tile, in the lookahead direction.

In some embodiments, the inter-tile preprocessing includes moving the first row by one position in a lookahead direction.

In some embodiments, the intra-tile preprocessing further includes moving a first element of a second weight tile of the first weight tensor by one position, within the second weight tile, in a lookaside direction.

In some embodiments: the first row is a row of a second weight tile of the first pre-processed weight tensor, the inter-tile preprocessing includes moving the first row, from the second weight tile to the first weight tile, in a lookaside direction.

In some embodiments, the inter-tile preprocessing further includes creating a tile sparsity map corresponding to the first pre-processed weight tensor, the tile sparsity map having: a column for each weight tile of the first pre-processed weight tensor, and a row for each row of the weight tiles, the tile sparsity map indicating positions of empty rows of the weight tiles of the first pre-processed weight tensor.

In some embodiments, the tile sparsity map has one fewer dimension than the first pre-processed weight tensor.

In some embodiments, the method further includes identifying the first row based on the tile sparsity map.

In some embodiments, the method further includes: multiplying the first row by a first vector of activations, to form a first dot product, wherein the multiplying includes fetching the vector of activations from a column of an activations buffer, the column of the activations buffer being second in the activations buffer.

In some embodiments, the method further includes: multiplying, in a first processing element circuit, the first row by a first vector of activations, to form a first dot product, multiplying, in a second processing element circuit, a second row of weights, of the first pre-processed weight tensor, by a second vector of activations, to form a second dot product, and adding the first product and the second product.

In some embodiments, the inter-tile preprocessing further includes moving a second row of the first pre-processed weight tensor by one position in a lookahead direction.

In some embodiments, the method further includes identifying the second row based on the tile sparsity map.

According to an embodiment of the present invention, there is provided a system, including: a first processing circuit, the first processing circuit being configured to: perform intra-tile preprocessing of a first weight tensor to form a first pre-processed weight tensor, and perform inter-tile preprocessing of the first pre-processed weight tensor, to form a second pre-processed weight tensor, the intra-tile preprocessing including moving a first element of a first weight tile of the first weight tensor by one position, within the first weight tile, in a lookahead direction or in a lookaside direction, and the inter-tile preprocessing including moving a first row a weight tile of the first pre-processed weight tensor by one position in a lookahead direction or by one position in a lookaside direction.

In some embodiments, the intra-tile preprocessing includes moving the first element of the first weight tile of the first weight tensor by one position, within the first weight tile, in the lookahead direction.

In some embodiments, the inter-tile preprocessing includes moving the first row by one position in a lookahead direction.

In some embodiments, the intra-tile preprocessing further includes moving a first element of a second weight tile of the first weight tensor by one position, within the second weight tile, in a lookaside direction.

In some embodiments: the first row is a row of a second weight tile of the first pre-processed weight tensor, the inter-tile preprocessing includes moving the first row, from the second weight tile to the first weight tile, in a lookaside direction.

In some embodiments, the inter-tile preprocessing further includes creating a tile sparsity map corresponding to the first pre-processed weight tensor, the tile sparsity map having: a column for each weight tile of the first pre-processed weight tensor, and a row for each row of the weight tiles, the tile sparsity map indicating positions of empty rows of the weight tiles of the first pre-processed weight tensor.

In some embodiments, the system further includes a second processing circuit including: a first processing element circuit, and a second processing element circuit, wherein: the first processing element circuit is configured to multiply the first row by a first vector of activations, to form a first dot product; and the second processing element circuit is configured to: multiply a third row of weights, of the first pre-processed weight tensor, by a second vector of activations, to form a second dot product, and add the first dot product and the second dot product.

According to an embodiment of the present invention, there is provided a system, including: means for processing, the means for processing being configured to: perform intra-tile preprocessing of a first weight tensor to form a first pre-processed weight tensor, and perform inter-tile preprocessing of the first pre-processed weight tensor, to form a second pre-processed weight tensor, the intra-tile preprocessing including moving a first element of a first weight tile of the first weight tensor by one position, within the first weight tile, in a lookahead direction or in a lookaside direction, and the inter-tile preprocessing including moving a first row of the first pre-processed weight tensor by one position in a lookahead direction or by one position in a lookaside direction.

BRIEF DESCRIPTION OF THE DRAWINGS

These and other features and advantages of the present disclosure will be appreciated and understood with reference to the specification, claims, and appended drawings wherein:

FIG. 2A is a data organizational diagram, according to an embodiment of the present disclosure;

FIG. 2B is a data organizational diagram, according to an embodiment of the present disclosure;

FIG. 2C is a data organizational diagram, according to an embodiment of the present disclosure;

FIG. 2D is a data organizational diagram, according to an embodiment of the present disclosure;

FIG. 2F is a data organizational diagram, according to an embodiment of the present disclosure;

FIG. 2G is a data organizational diagram, according to an embodiment of the present disclosure;

FIG. 2H is a data organizational diagram, according to an embodiment of the present disclosure;

FIG. 2I is a data organizational diagram, according to an embodiment of the present disclosure;

FIG. 4B is a table of axes, according to an embodiment of the present disclosure;

FIG. 4F is a table of costs, according to an embodiment of the present disclosure;

DETAILED DESCRIPTION

The detailed description set forth below in connection with the appended drawings is intended as a description of exemplary embodiments of a system and method for hierarchical weight preprocessing for a neural network accelerator provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
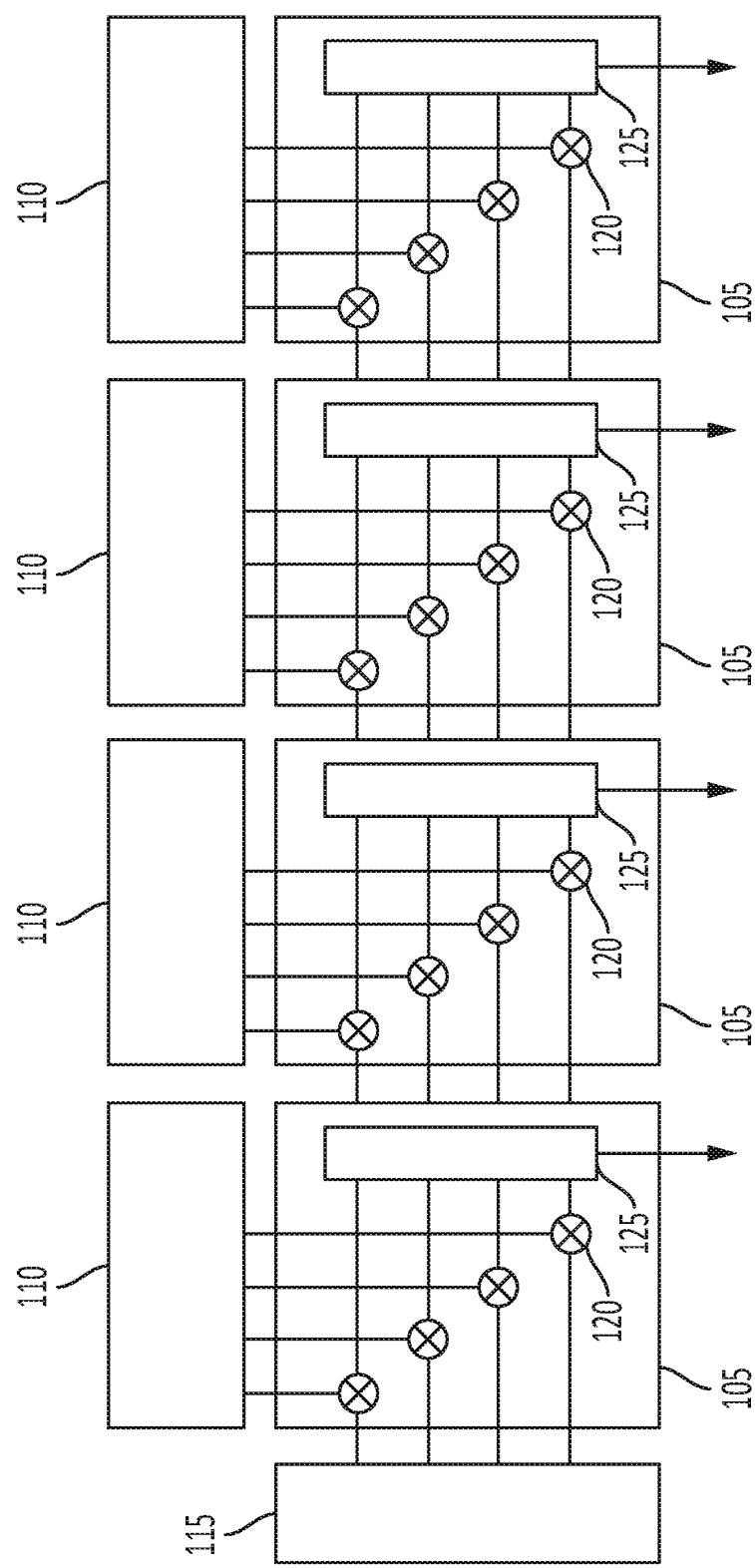
FIG. 1 is a block diagram, according to an embodiment of the present disclosure.

In computations performed for a neural network, e.g., a convolutional neural network, various operations may be performed on tensors of weights and tensors of activations (the latter of which may be referred to as the input feature map (IFM)). One such operation is a tensor product in which some dimensions (which may be referred to as reducible dimensions) are summed over, and some dimensions (which may be referred to as irreducible dimensions) are not summed over. The calculation of such a tensor product may be performed by a processing circuit that may include an array of processing element circuits 105 (or simply "processing elements" or "tiles"), as shown in FIG. 1. Each tile may be fed weights from a weight buffer 110 and activations from an activation buffer 115. Each tile may include an array of multipliers 120, and an adder tree 125. In operation, in each computation cycle (which may include a single cycle of the system clock, or several cycles of the system clock), each tile may (i) read a vector of activations from a column of the (shared) activation buffer, (ii) read a vector (or "row") of weights from a row of its weights buffer, and multiply the vectors to form a dot product. The multiplying of the vectors may include calculating (in the multipliers) element-wise products of the vector of activations and the row of weights, and summing (in the adder tree) the products.

It may be possible for such a system to skip performing multiplications when some of the elements of the weight tensor are zeros. For example, referring to FIG. 2A, each array of the arrays of weights for four tiles may include some elements that are zero, or "empty" (illustrated as unshaded squares) and some elements that are nonzero (illustrated as shaded squares). The array of weights corresponding to a tile may be referred to as a "weight tile". In each of the first, second, and third weight tiles, an element labeled "lookahead" will, if processed one computation cycle earlier, cause the row it currently occupies to become entirely empty (i.e., all of the elements of the row will be zero), which means that the processing could skip the row and proceed directly to the next row. For example, the array of weights for Tile 1 (i.e., the first weight tile, labeled "Tile #1") has a single nonzero element (labeled "lookahead") in the second row, and the element in the first row and in the same column is empty. As such, moving the element labeled "lookahead" to the preceding row (a direction that may be referred to as the "lookahead" direction) will cause the second row to become empty. Such out of order processing may be accomplished by modifying the weight tensor and (as discussed in further detail below) by using multiplexers to allow the tiles to access elements from columns other than the current column in the activation buffer.

Figure 2A:
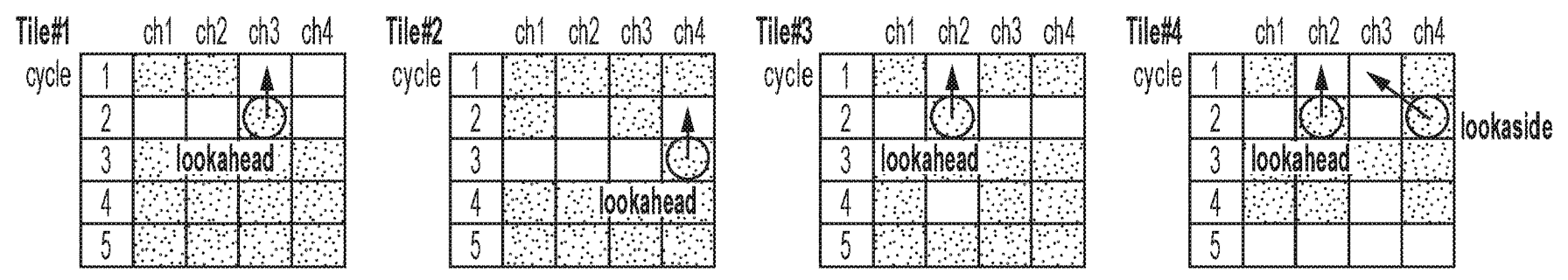

In the example of FIG. 2A, the second row of the fourth weight tile includes one element (labeled "lookahead") that may be moved into the position directly above it (i.e., into the first row, in the same column) and another element (labeled "lookaside") that is in the second row and that cannot be moved directly upward because the element directly above it is not empty. The element labeled "lookaside" may, however, be moved up one row and into the adjacent column (i.e., up, and from the fourth column to the third column) because the element above and to the left of the element labeled "lookaside" is empty. The direction in which the element labeled "lookaside" is moved may be referred to as the "lookaside" direction.

Figure 2B:
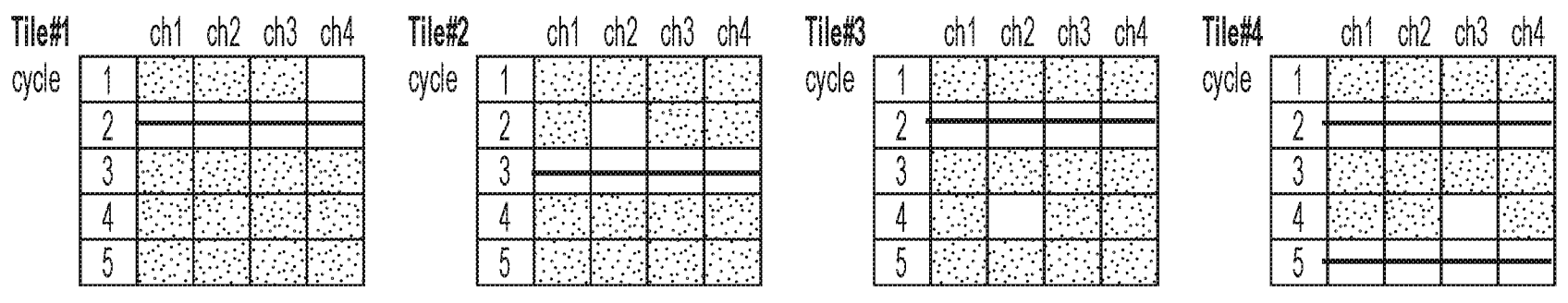

Once all of the modifications to the arrays of weights have been made, the modified weight tensor may appear as illustrated in FIG. 2B. The weights are elements of a three-dimensional tensor that includes the four (two-dimensional) weight tiles (each being, itself, a tensor). As mentioned above, each array of weights associated with a tile may be referred to as a "weight tile" (as used herein, the word "tile" without the qualifier "weight" refers to a processing element). The modified tensor illustrated in FIG. 2B may be referred to as a "preprocessed weight tensor" or as a "first preprocessed weight tensor"; the modifications made to the tensor to form the first preprocessed weight tensor may be referred to as "intra-tile preprocessing" because decisions regarding which elements are to be moved within any one of the weight tiles are based only on the positions of empty elements within the weight tile.

The embodiment of FIG. 1 may be unable to take advantage of the empty rows produced by the intra-tile preprocessing, because the activation buffer may be configured to send the same activation vector to all of the tiles during any computation cycle. As such, if the system were to skip the second computation cycle, in which the first, third, and fourth weight tiles have empty rows, the correct products would not be calculated from the weights in the second row of the second weight tile. In some embodiments, a plurality of activation buffers is employed, one for each tile, to skip rows at different times.

In some embodiments, the use of multiple activation buffers may be avoided by performing an additional preprocessing step, which may be referred to as "inter-tile preprocessing". In inter-tile preprocessing, elements of a weight tile may be moved based on empty elements of other weight tiles, and elements may be moved from one weight tile to another, as discussed in further detail below. Inter-tile preprocessing may form another pre-processed weight tensor (which may be referred to as a "second pre-processed weight tensor") from the first pre-processed weight tensor, and, as such, intra-tile preprocessing and inter-tile pre-processing may form two levels of a weight tensor preprocessing hierarchy.

To perform inter-tile preprocessing, a tile sparsity map (having one fewer dimension than the weight tensor) may first be generated. A tile sparsity map for the first pre-processed weight tensor of FIG. 2B is shown in FIG. 2C. The tile sparsity map may have one element for each row of each weight tile of the first pre-processed weight tensor, the element being a zero if the row is empty, and the element being a one if the row is not empty. In other embodiments, the same information may be otherwise represented (e.g., with a one indicating an empty row and a zero indicating that a row is not empty), or additional information may also be captured by the tile sparsity map (as in FIG. 2C, in which the symbols in the squares indicate whether the row is empty, and, if it is not, what computation cycle it corresponds to, before inter-tile preprocessing is performed).

The tile sparsity map may be used to identify further modifications to the weight tensor that may enable the system to take advantage of the empty rows produced by the intra-tile preprocessing. For example, it may be seen that by moving the third element of the first column up one position, moving the second and third elements of the third column up one position each, and moving the third element of the fourth column up one position, the tile sparsity map may be modified so that, as shown in FIG. 2D, the third row is empty. This result implies (i) that the further adjustments to the weight tensor result in weight tiles that all have an empty row in the third computation cycle, and (ii) that the third computation cycle may be skipped, in a system in which the activation buffer is configured to send the same activation vector to all of the tiles during each computation cycle, if the weights are adjusted in this manner.

Figure 2E:
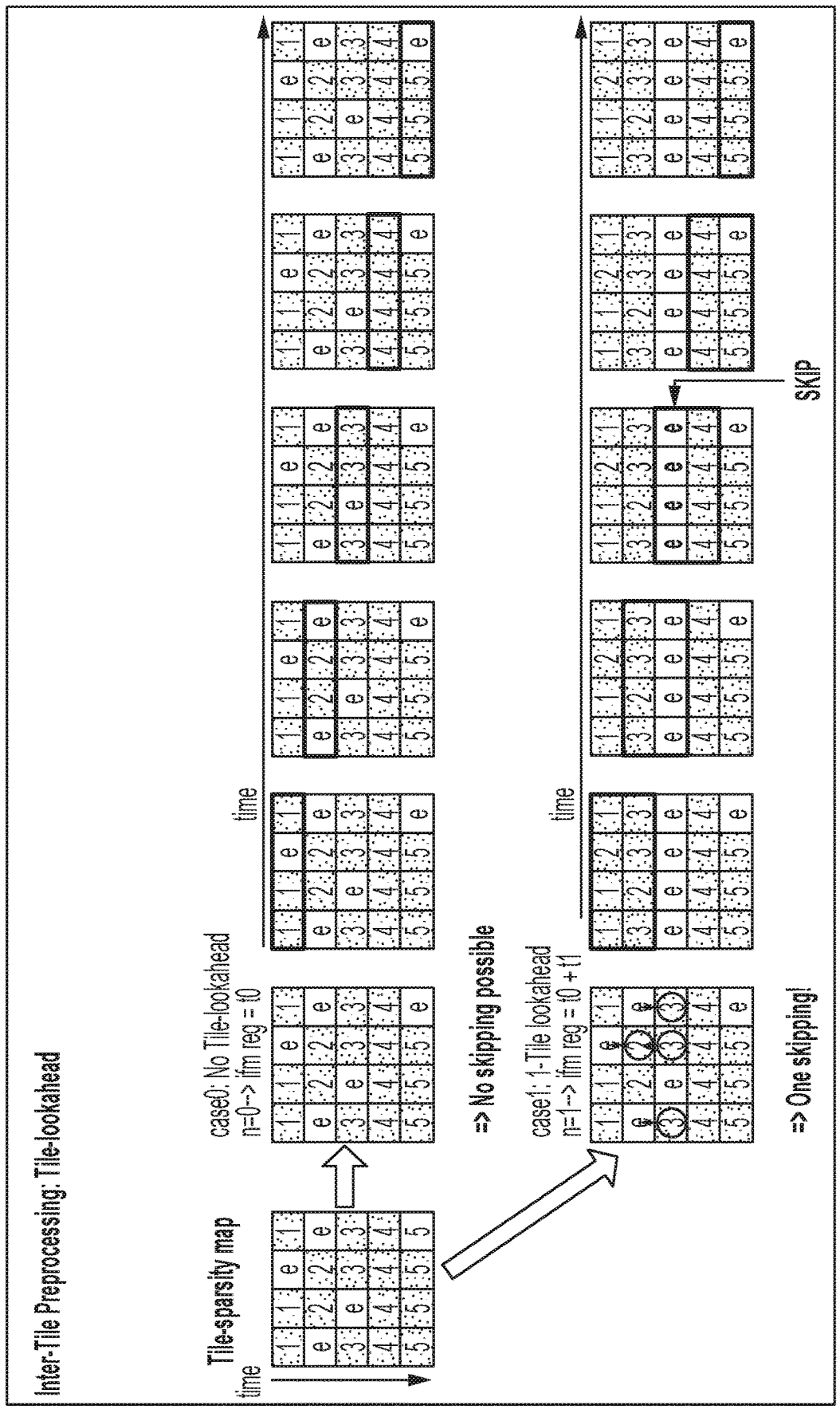
FIG. 2E is a data organizational diagram, according to an embodiment of the present disclosure.

FIG. 2E shows sequences of computation cycles for two different cases: a first case ("case0") in which no modifications are made to the weight tensor, and no computation cycles are skipped (because there is no computation cycle for which all of the weight tiles have an empty row), and a second case ("case1"), in which the third computation cycle is skipped, the third row of each weight tile being empty as a result of, first, intra-tile preprocessing, and, second, inter-tile preprocessing. FIG. 2E also illustrates, for the second case, the inter-tile lookaheads (described above) that may be performed to arrive at a tile sparsity map with an empty row. Each of the inter-tile lookaheads involves moving all of the weights (or, equivalently, all of the non-zero weights) in a row of the weight tile in a lookahead direction (i.e., up, in the representation of FIGS. 2C and 2E) by one position, so that, for example (as shown in FIGS. 2C-2E), after inter-tile preprocessing is complete, the second row of the first tile of the second pre-processed weight tensor is the third row of the first tile of the first pre-processed weight tensor. When a row of a weight tile is moved by one position in the lookahead direction, the vector of activations by which it is multiplied in operation may be (instead of being the current (first) vector in the activation buffer 115), the second vector in the activation buffer 115, i.e., the vector in the activation buffer 115 that, if no lookaheads had been performed in preprocessing, would be processed during the next computation cycle.

Figure 2F:
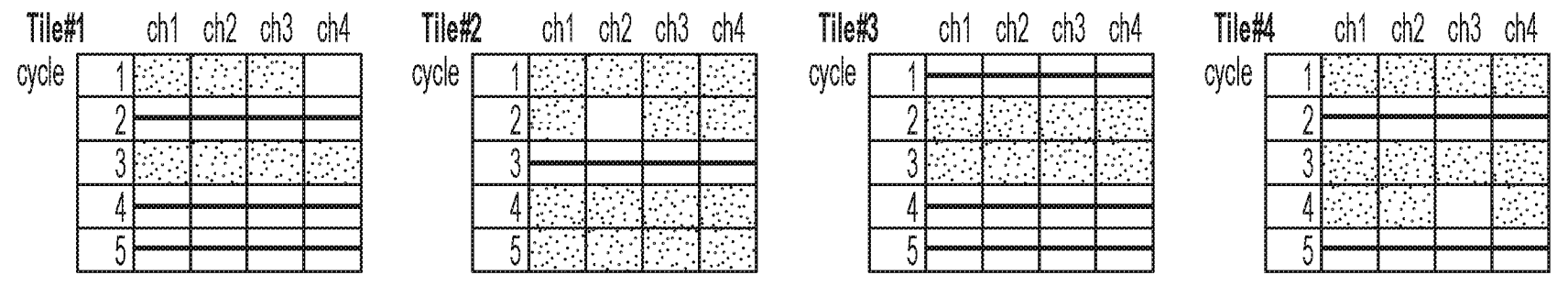

In some circumstances, the skipping of additional computation cycles may be made possible by performing tile lookaside, i.e., moving weights, within the weight tensor, from one weight tile into another. FIG. 2F shows weight tiles (after intra-tile preprocessing) in one example, and FIG. 2G shows the tile sparsity map for the weight tiles of FIG. 2F. FIGS. 2H and 2I show that using a combination of tile lookaheads and tile lookasides the tile sparsity map can be rearranged (and the weight tensor can be modified in an analogous manner) so that two computation cycles may be skipped. Each tile lookaside involves moving a row of weights from one weight tile to the row that is one processing cycle earlier in another weight tile, so that, for example (as shown in FIG. 2H), after inter-tile preprocessing is complete, the fourth row of the first weight tile of the second pre-processed weight tensor is the fifth row of the second weight tile of the first pre-processed weight tensor. Such a move may (like the intra-tile lookaside move described above) be referred to as a move in a "lookaside" direction.

Figure 2J:
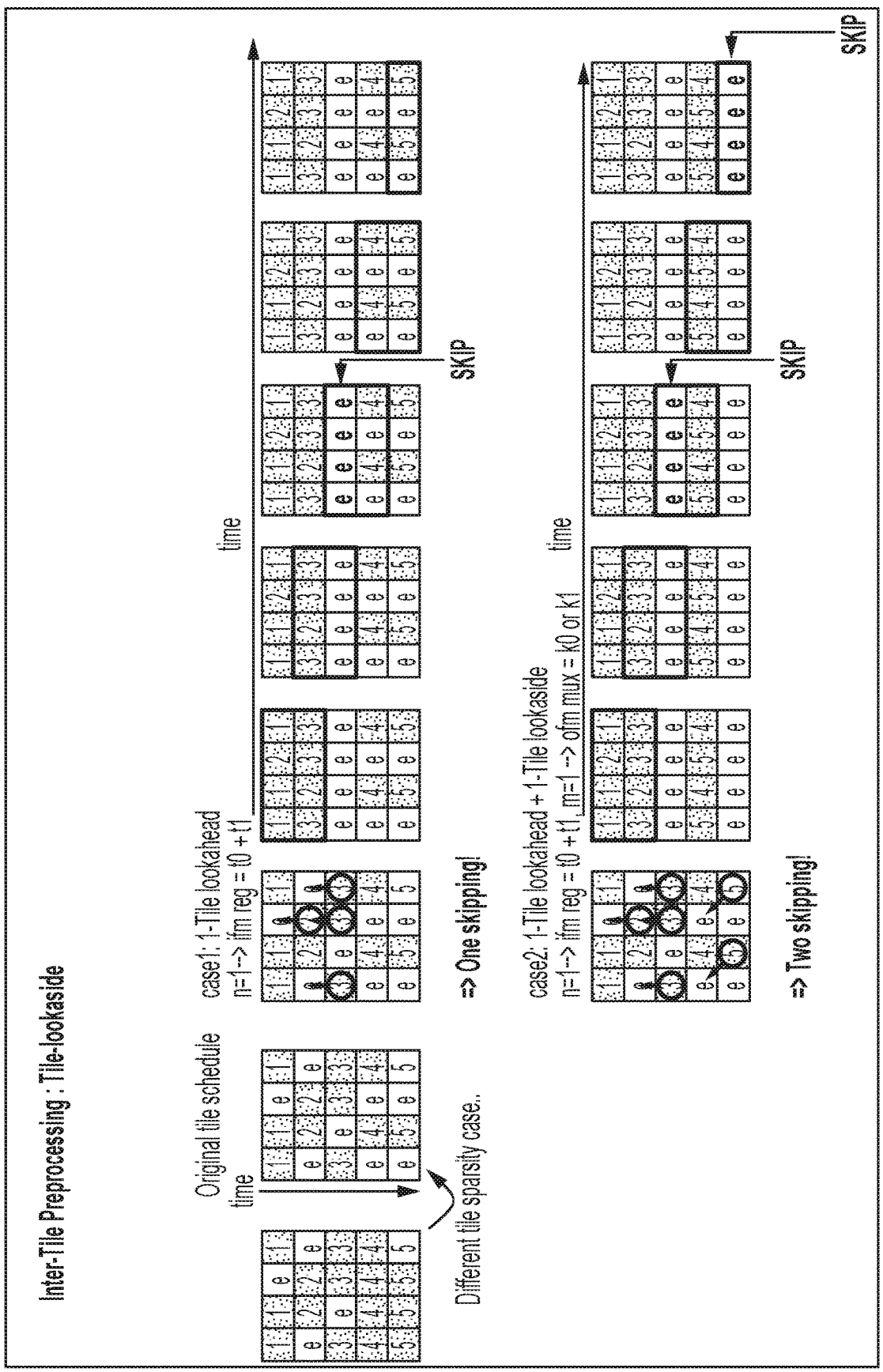
FIG. 2J is a data organizational diagram, according to an embodiment of the present disclosure.

FIG. 2J shows sequences of computation cycles for two different cases: a first case ("case1") in which the inter-tile preprocessing involves only tile lookaheads, and a second case ("case2"), in which the inter-tile preprocessing involves both tile lookaheads and tile lookasides. It may be seen from FIG. 2J that in this example an additional computation cycle may be skipped if tile lookasides are used.

Figure 3:
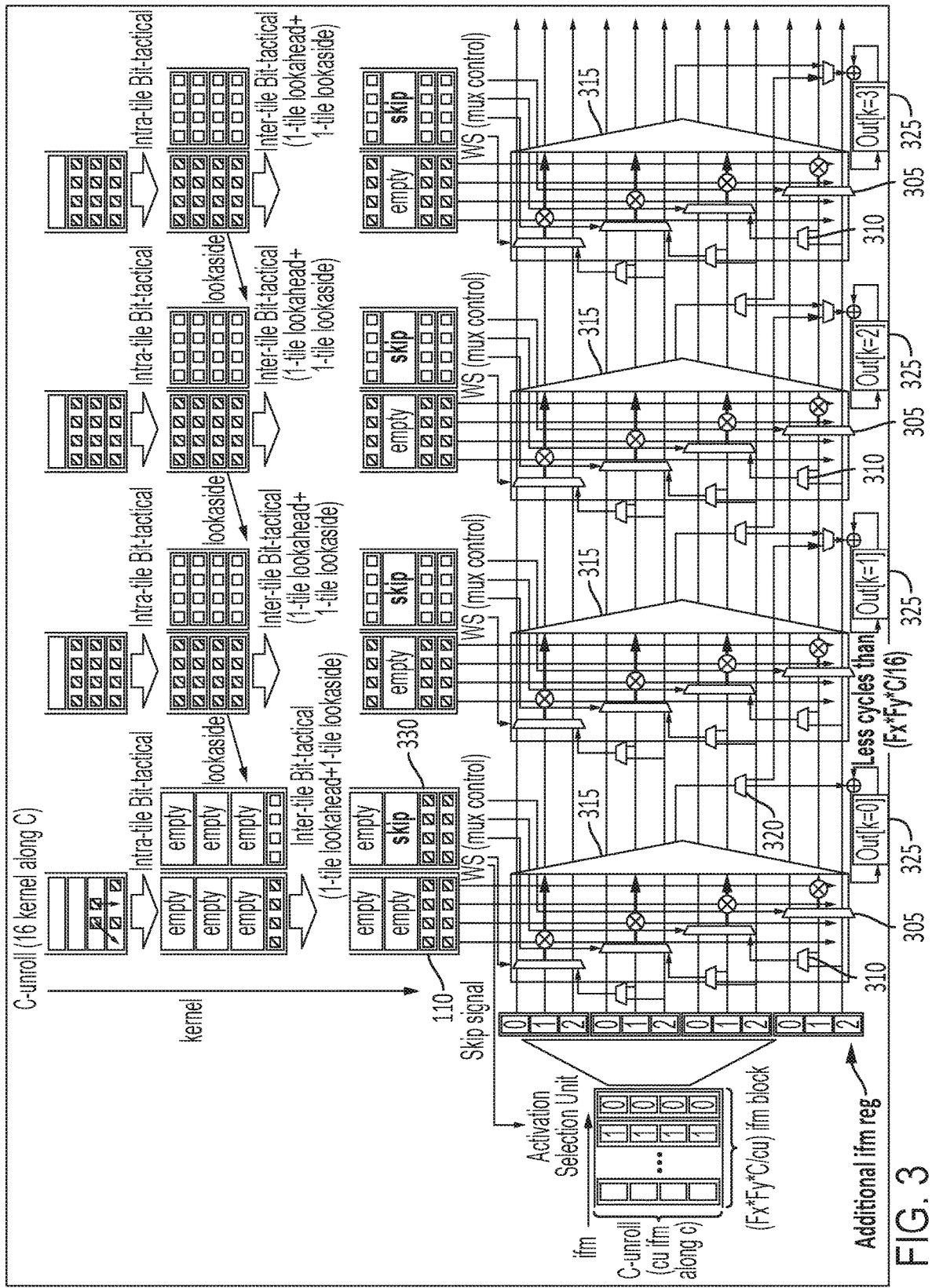
FIG. 3 is a simplified circuit diagram, according to an embodiment of the present disclosure.

FIG. 3 shows a circuit for performing tensor calculations, in some embodiments. When weights of the weight tensor are moved to make cycle skipping possible, the activations are also moved, so that each activation is multiplied by the appropriate weight. As mentioned above, the weights may be moved during preprocessing, e.g., by a processing circuit (discussed in further detail below), and the activations may be moved during operation, using multiplexers, as shown. A set of first multiplexers 305 is used to perform movement, of activations, that corresponds to (1) weights moved by intra-tile lookahead followed by inter-tile lookahead, and to (2) weights moved by intra-tile lookaside followed by inter-tile lookahead (this second part is supplied as a multiplexer input from the multiplexer 310 as explained in the sentence that follows). The set of second multiplexers 310 is used (i) to perform selection, of activations, that corresponds to intra-tile lookahead followed by inter-tile lookahead and (ii) to send the result to one of the input ports of the multiplexer 305. The output of each adder tree 315 is connected to a demultiplexer 320 that (i) transfers the results of tile lookasides (which are lookasides in an irreducible dimension) back to the tile in which the weights were originally (before preprocessing of the weights) and that (ii) sends other results to an accumulator 325. Control signals for the multiplexers are generated at the same time the preprocessing of the weights is performed, and fed to each tile from a respective control bit buffer 330 that is parallel to the weight buffer 110.

Figure 4A:
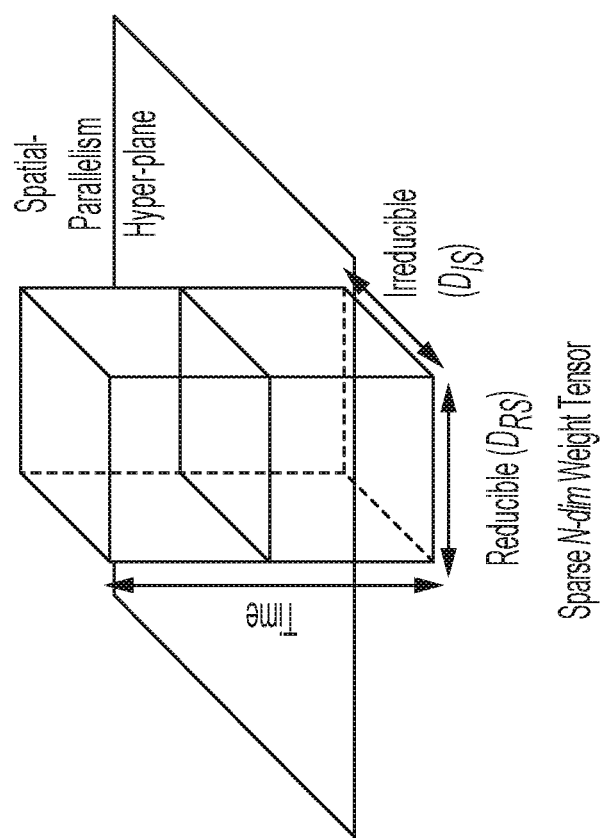
FIG. 4A is an illustration of a tensor, according to an embodiment of the present disclosure.
Figure 4C:
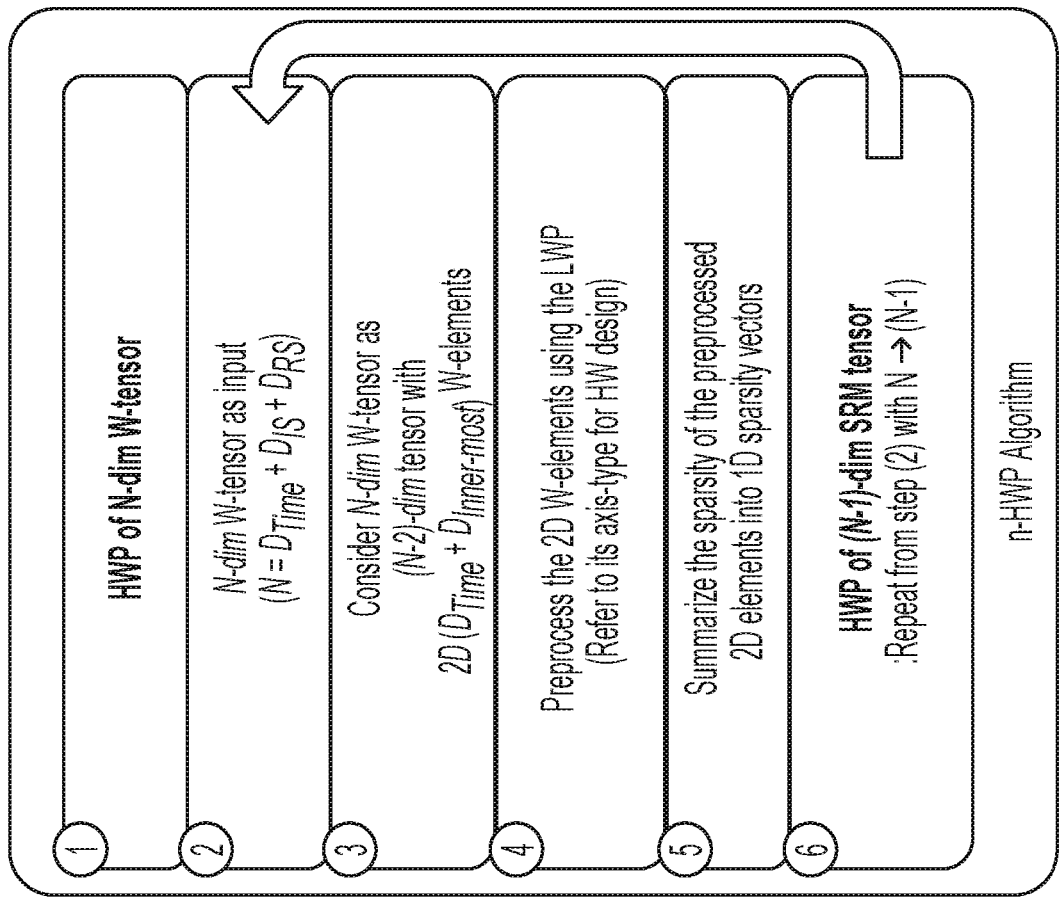
FIG. 4C is a flow chart, according to an embodiment of the present disclosure.
Figure 4D:
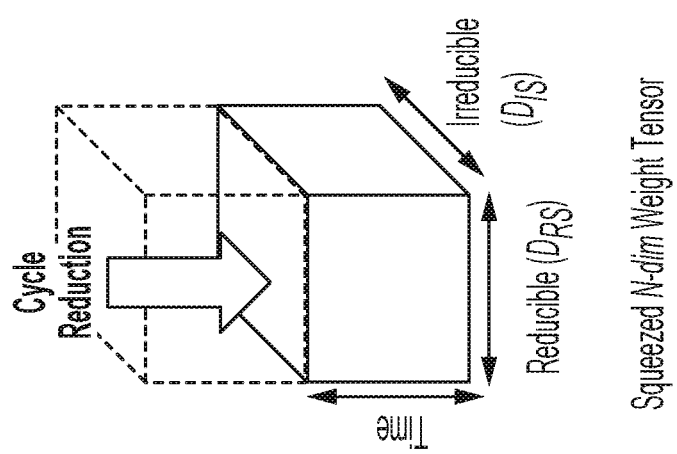
FIG. 4D is an illustration of a tensor, according to an embodiment of the present disclosure.
Figure 4E:
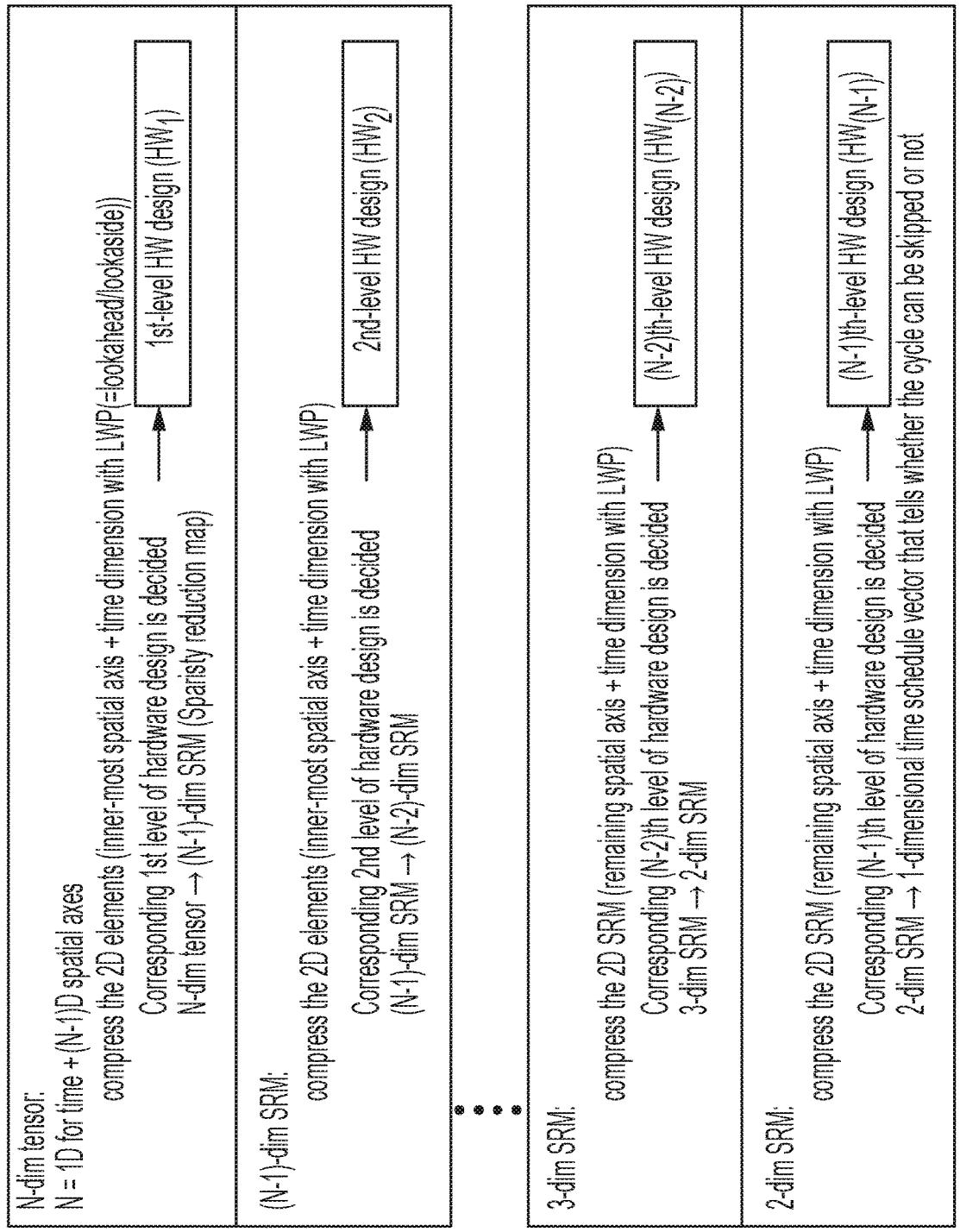
FIG. 4E is a flow chart, according to an embodiment of the present disclosure.

The concepts discussed above for the case of a three-dimensional weight tensor (in which one dimension is reducible and one dimension is irreducible) may be generalized to tensors with a larger number of dimensions as follows. FIG. 4A illustrates a general N-dimensional weight tensor, having one or more reducible dimensions and zero or more irreducible dimensions. The dimensions may be sorted in order of innermost to outermost (referring to the nesting of loops that may be employed to process the tensor). Each spatial-parallelism hyperplane in the weight tensor is processed simultaneously in a computation cycle. Some embodiments reduce the number of computation cycles to accelerate the speed of processing, by providing compression of the sparse weight tensor within the timeaxis. FIG. 4B is a table showing which axes are reducible and which axes are irreducible, for two different computations, convolution, and GEMV(F.C.). FIG. 4C is a flow chart illustrating an iterative process by which an N-dimensional tensor may be pre-processed in reducible dimensions and irreducible dimensions, beginning with hierarchical weight processing (HWP) of the N-dimensional weight tensor. In FIG. 4C, LWP means "local weight preprocessing" which is lookahead and lookaside of a two-dimensional weight tensor (which may be represented as a matrix) as the lowest level of weight preprocessing. For example, in a three-dimensional case (i.e. N=3), the process may proceed as follows. In Step 1 (indicated by a circled "1") in FIG. 4C, an N-dimensional weight tensor (with, e.g., N=3) is ready to be processed using hierarchical weight processing (HWP) to accelerate the computation. In Step 2, the dimensionality of 3 can be divided into three categories, as 3 dimensions=1 (time-axis)+2(spatial axes)=1(time-axis)+1(irreducible axis: multiple tiles)+1(reducible axis: multiple multipliers in a processing element). In Step 3, the three-dimensional weight tensor may be considered as a one-dimensional (1=N−2=3−2) ordered set of two-dimensional tensors, each of which may be, or may be analogous to, one of the two-dimensional weight tiles illustrated in FIG. 2A. In Step 4, by using lookahead and lookaside, the first level of weight preprocessing, which is intra-tile preprocessing in this case, may be performed. In Step 5 and Step 6, each two-dimensional tensor of the ordered set may be summarized in a one-dimensional sparsity vector in order to generate an (N−1)-dimensional sparsity reduction map (SRM) (a two-dimensional SRM being the tile sparsity map in the case of a three-dimensional hierarchical weight processing case). The process may then return to Step 2. The first level of preprocessing having been completed, the tensor of interest for the next iteration becomes the two-dimensional ((N−1)-dimensional) sparsity reduction map, and the process repeats the preprocessing steps to complete the second level of preprocessing, which is inter-tile preprocessing. In a processing circuit including an array of processing element circuits 105 the dimension of spatial parallelism may be three, and the dimensionality of the weight tensor may be four (1 time+3 space). In this case, three iterations may be performed in FIG. 4C to produce a synchronized four-dimensional tensor like that shown in FIG. 2I. The example of three dimensions for FIG. 4C may be extended to higher dimensions, such as four dimensions or five dimensions. FIG. 4E is a more detailed flow chart of the method illustrated in FIG. 4C. FIG. 4F is a table showing the (process and overhead) costs of hardware for performing preprocessing along a reducible axis and along an irreducible axis.

Figure 4G:
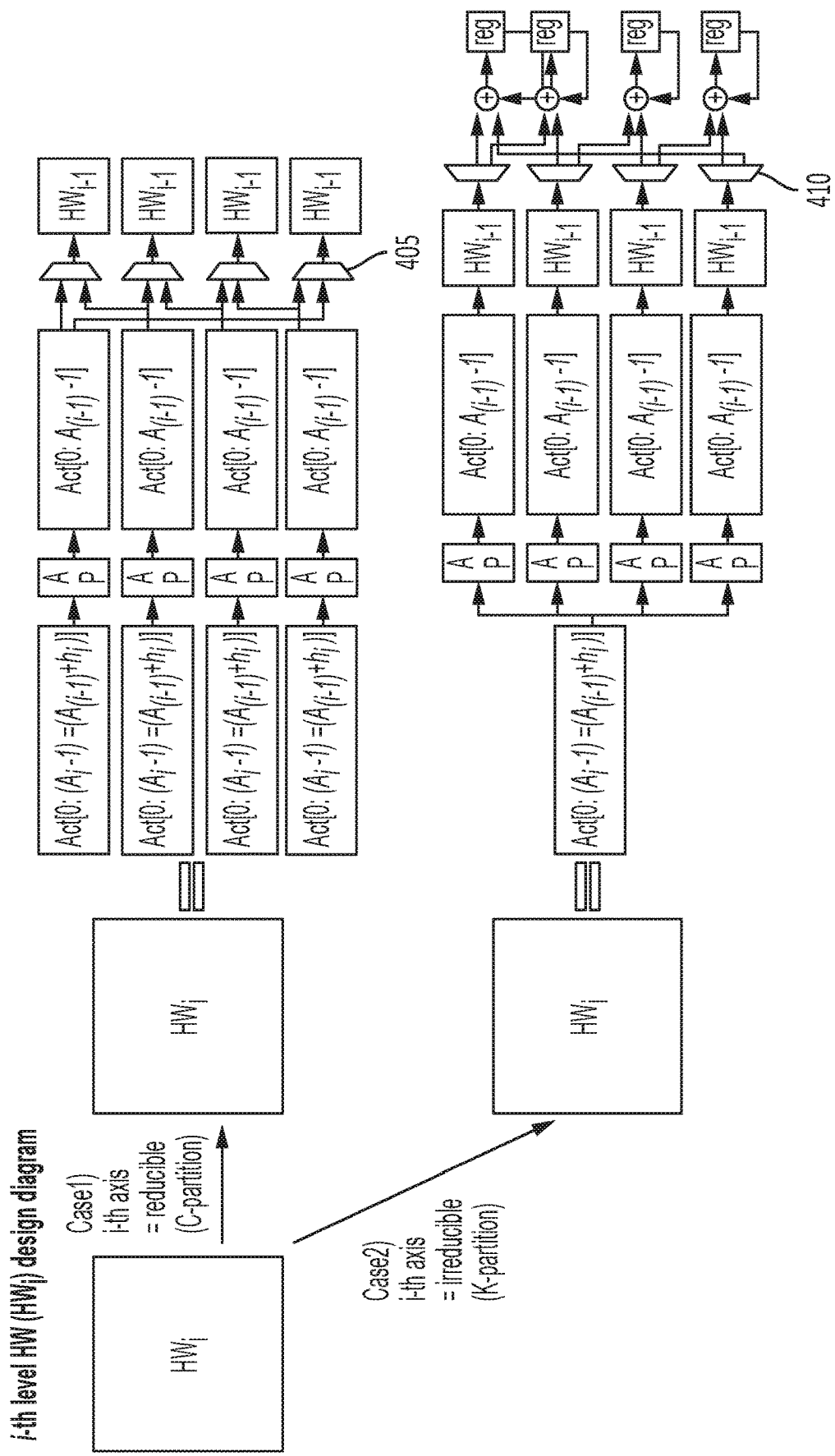
FIG. 4G is a hybrid block and schematic diagram, according to an embodiment of the present disclosure.
Figure 4H:
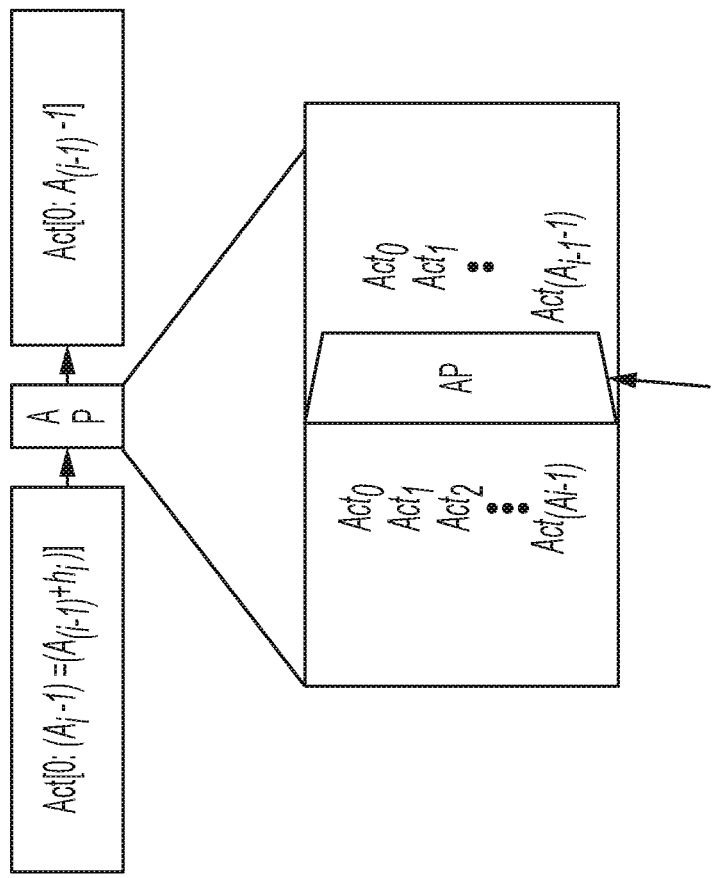
FIG. 4H is a hybrid block and schematic diagram, according to an embodiment of the present disclosure.
Figure 4I:
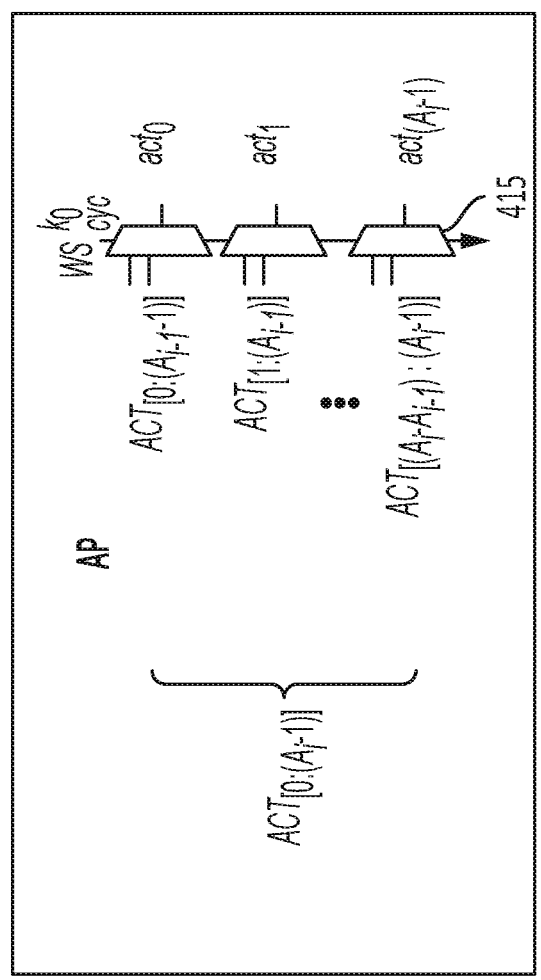
FIG. 4I is a schematic diagram, according to an embodiment of the present disclosure.

FIG. 4G shows a block diagram showing hardware for reducible dimensions and irreducible dimensions. In the reducible dimensions, the rearranging of the activations, to comport with the rearranging of the weights performed in preprocessing, may be performed in two stages. An activation promoter (AP) may perform the rearranging of activations corresponding to the inter-tile preprocessing (e.g., moving a row of activations at a time, in the example of FIGS. 2G-2J), and multiplexers 405 may perform the rearranging of activations corresponding to the intra-tile preprocessing (e.g., moving one weight at a time, in the example of FIGS. 2A and 2B). In the irreducible dimensions, the rearranging of the activations, to comport with the rearranging of the weights performed in preprocessing, may involve only the first (activation promoter) stage, and after the multiplications are performed, demultiplexers 410 may be used to transfer the results of tile lookasides (which are lookasides in an irreducible dimension) back to the tile in which the weights were originally. In FIG. 4G, in the irreducible case, the activation registers may be shared by broadcasting to multiple inner levels of HWi-1, like the activation broadcasting to multiple tiles that may be used in three-dimensional hierarchical weight processing. In FIG. 4G, $A_i$ is the number of activation-cycles (equal to the number of activation registers) supplied for $HW_i$, and the elements of ($h_i$, $d_i$, $h'_i$, $d'_i$) are the lookahead for reducible-axis, lookaside for reducible-axis, lookahead for irreducible-axis, and lookaside for irreducible-axis, respectively. FIG. 4H is a schematic block diagram showing the operation of the activation promoter, which may select continuous $A_{(i-1)}$ activation cycles from $A_i$ activation cycles, an operation that may be analogous to that of a sliding window. FIG. 4I shows an implementation of an activation promoter, in some embodiments, in which multiplexers 415 with two inputs are used to support one computation cycle of inter-tile lookahead (as in the example of FIG. 3, in which the second multiplexers 310 correspond to the activation promoter). In other embodiments, the multiplexers may have more inputs, and a larger number of computation cycles of inter-tile lookahead may be supported. In FIG. 4I, WS is a mux signal which is shared through all of the activation promoters in the $HW_i$ unit.

As used herein, "a portion of" something means "at least some of" the thing, and as such may mean less than all of, or all of, the thing. As such, "a portion of" a thing includes the entire thing as a special case, i.e., the entire thing is an example of a portion of the thing.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, the term "array" refers to an ordered set of numbers regardless of how stored (e.g., whether stored in consecutive memory locations, or in a linked list). As used herein, the term "rectangle" includes a square as a special case, i.e., a square is an example of a rectangle. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept. Examples in which the context indicates otherwise include phrases such as "the column being second in the activations buffer" or "the row is first among the rows of the matrix".

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for hierarchical weight preprocessing for a neural network accelerator have been specifically described and illustrated herein, many modifications and variations will be apparent to those skilled in the art. Accordingly, it is to be understood that a system and method for hierarchical weight preprocessing for a neural network accelerator constructed according to principles of this disclosure may be embodied other than as specifically described herein. The invention is also defined in the following claims, and equivalents thereof.

What is claimed is:

1. A method, comprising:
performing intra-tile preprocessing of a first weight tensor to form a first pre-processed weight tensor,
performing inter-tile preprocessing of the first pre-processed weight tensor, to form a second pre-processed weight tensor,
performing, by a processing circuit, a first computation cycle on a first row of the second pre-processed weight tensor,
skipping, by the processing circuit, a second row of the second pre-processed weight tensor based on the intra-tile preprocessing and the inter-tile preprocessing, and
performing, by the processing circuit, a second computation cycle on a third row of the second pre-processed weight tensor in place of the second row of the second pre-processed weight tensor, such that the first row of the second pre-processed weight tensor and the third row of the second pre-processed weight tensor are processed in two computation cycles, instead of three computational cycles, the intra-tile preprocessing comprising causing a first row of a first weight tile of the first weight tensor to be empty by moving a first element of the first weight tile of the first weight tensor by one position, within the first weight tile, in a lookahead direction or in a lookaside direction, and the inter-tile preprocessing comprising causing the second row of the second pre-processed weight tensor to be empty by moving a second row of a first weight tile of the first pre-processed weight tensor by one position, in a lookahead direction or by one position in a lookaside direction, based on a second row of a second weight tile of the first pre-processed weight tensor being empty.

2. The method of claim 1, wherein the intra-tile preprocessing comprises moving the first element of the first weight tile of the first weight tensor by one position, within the first weight tile, in the lookahead direction.

3. The method of claim 1, wherein the inter-tile preprocessing comprises moving the second row by one position in a lookahead direction.

4. The method of claim 1, wherein the intra-tile preprocessing further comprises moving a first element of a second weight tile of the first weight tensor by one position, within the second weight tile, in a lookaside direction.

5. The method of claim 1, wherein
the inter-tile preprocessing comprises moving a second row of the second weight tile to the first weight tile, in a lookaside direction.

6. The method of claim 5, wherein the inter-tile preprocessing further comprises creating a tile sparsity map corresponding to the first pre-processed weight tensor, the tile sparsity map having:
a column for each weight tile of the first pre-processed weight tensor, and
a row for each row of the weight tiles,
the tile sparsity map indicating positions of empty rows of the weight tiles of the first pre-processed weight tensor.

7. The method of claim 6, wherein the tile sparsity map has one fewer dimension than the first pre-processed weight tensor.

8. The method of claim 6, further comprising identifying the first row of the first weight tile based on the tile sparsity map.

9. The method of claim 6, further comprising:
multiplying a third row of the first weight tile by a first vector of activations, to form a first dot product,
wherein the multiplying comprises fetching the first vector of activations from a column of an activations buffer, the column of the activations buffer being second in the activations buffer.

10. The method of claim 6, further comprising:
multiplying, in a first processing element circuit, a third row of the first weight tile by a first vector of activations, to form a first dot product,
multiplying, in a second processing element circuit, a third row of weights, of the first pre-processed weight tensor, by a second vector of activations, to form a second dot product, and
adding the first dot product and the second dot product.

11. The method of claim 6, wherein the inter-tile preprocessing further comprises moving a third row of the first pre-processed weight tensor by one position in a lookahead direction.

12. The method of claim 11, further comprising identifying the third row based on the tile sparsity map.

13. A system, comprising:
a first processing circuit, the first processing circuit being configured to:
perform intra-tile preprocessing of a first weight tensor to form a first pre-processed weight tensor,
perform inter-tile preprocessing of the first pre-processed weight tensor, to form a second pre-processed weight tensor,
perform a first computation cycle on a first row of the second pre-processed weight tensor,
skip a second row of the second pre-processed weight tensor based on the intra-tile preprocessing and the inter-tile preprocessing, and
perform a second computation cycle on a third row of the second pre-processed weight tensor in place of the second row of the second pre-processed weight tensor,
such that the first row of the second pre-processed weight tensor and the third row of the second pre-processed weight tensor are processed in two computation cycles, instead of three computational cycles,
the intra-tile preprocessing comprising causing a first row of a first weight tile of the first weight tensor to be empty by moving a first element of the first weight tile of the first weight tensor by one position, within the first weight tile, in a lookahead direction or in a lookaside direction, and
the inter-tile preprocessing comprising causing the second row of the second pre-processed weight tensor to be empty by moving a second row of a first weight tile of the first pre-processed weight tensor by one position, in a lookahead direction or by one position in a lookaside direction, based on a second row of a second weight tile of the first pre-processed weight tensor being empty.

14. The system of claim 13, wherein the intra-tile preprocessing comprises moving the first element of the first weight tile of the first weight tensor by one position, within the first weight tile, in the lookahead direction.

15. The system of claim 13, wherein the inter-tile preprocessing comprises moving the second row by one position in a lookahead direction.

16. The system of claim 13, wherein the intra-tile preprocessing further comprises moving a first element of a second weight tile of the first weight tensor by one position, within the second weight tile, in a lookaside direction.

17. The system of claim 13, wherein
the inter-tile preprocessing comprises moving a second row of the second weight tile to the first weight tile, in a lookaside direction.

18. The system of claim 17, wherein the inter-tile preprocessing further comprises creating a tile sparsity map corresponding to the first pre-processed weight tensor, the tile sparsity map having:
a column for each weight tile of the first pre-processed weight tensor, and
a row for each row of the weight tiles,
the tile sparsity map indicating positions of empty rows of the weight tiles of the first pre-processed weight tensor.

19. The system of claim 18, further comprising a second processing circuit comprising:
a first processing element circuit, and
a second processing element circuit,
wherein:
   the first processing element circuit is configured to multiply a third row of the first weight tile by a first vector of activations, to form a first dot product; and
   the second processing element circuit is configured to:
      multiply a fourth row of weights, of the first pre-processed weight tensor, by a second vector of activations, to form a second dot product, and
      add the first dot product and the second dot product.

20. A system, comprising:
a processing circuit; and
a memory communicatively coupled to the processing circuit, the memory storing instructions, which, based on being executed by the processing circuit, cause the processing circuit to:
   perform intra-tile preprocessing of a first weight tensor to form a first pre-processed weight tensor,
   perform inter-tile preprocessing of the first pre-processed weight tensor, to form a second pre-processed weight tensor,
   perform a first computation cycle on a first row of the second pre-processed weight tensor,
   skip a second row of the second pre-processed weight tensor based on the intra-tile preprocessing and the inter-tile preprocessing, and
   perform a second computation cycle on a third row of the second pre-processed weight tensor in place of the second row of the second pre-processed weight tensor,
      such that the first row of the second pre-processed weight tensor and the third row of the second pre-processed weight tensor are processed in two computation cycles, instead of three computational cycles,
the intra-tile preprocessing comprising causing a first row of a first weight tile of the first weight tensor to be empty by moving a first element of a first weight tile of the first weight tensor by one position, within the first weight tile, in a lookahead direction or in a lookaside direction, and
the inter-tile preprocessing comprising causing the second row of the second pre-processed weight tensor to be empty by moving a second row of a first weight tile of the first pre-processed weight tensor by one position, in a lookahead direction or by one position in a lookaside direction, based on a second row of a second weight tile of the first pre-processed weight tensor being empty.

* * * * *